(12) United States Patent
Asafuji et al.

(10) Patent No.: US 12,127,284 B2
(45) Date of Patent: Oct. 22, 2024

(54) ON-VEHICLE DEVICE AND CONTROL METHOD OF ON-VEHICLE DEVICE

(71) Applicant: HONDA MOTOR CO., LTD., Tokyo (JP)

(72) Inventors: Ryosuke Asafuji, Tokyo (JP); Shinichi Kobayashi, Tokyo (JP); Naoto Furuyama, Tokyo (JP); Daiki Kawase, Tokyo (JP); Ryosuke Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 17/674,057

(22) Filed: Feb. 17, 2022

(65) Prior Publication Data
US 2022/0304090 A1  Sep. 22, 2022

(30) Foreign Application Priority Data
Mar. 22, 2021  (JP) .................................. 2021-047859

(51) Int. Cl.
| | |
|---|---|
| H04W 76/15 | (2018.01) |
| G06F 3/0482 | (2013.01) |
| G06F 3/04847 | (2022.01) |
| H04W 76/14 | (2018.01) |
| H04W 88/06 | (2009.01) |

(52) U.S. Cl.
CPC .......... *H04W 76/15* (2018.02); *G06F 3/0482* (2013.01); *G06F 3/04847* (2013.01); *H04W 76/14* (2018.02); *H04W 88/06* (2013.01)

(58) Field of Classification Search
CPC ............. H04W 72/23; H04W 72/0446; H04W 72/0453; H04W 72/21; H04W 72/56; H04W 72/542; H04L 5/00; H04L 5/0053
See application file for complete search history.

(56) References Cited

U.S. PATENT DOCUMENTS

| | | | | |
|---|---|---|---|---|
| 10,491,734 | B1 * | 11/2019 | Annasagaram Krishnamurthy .... | H04W 12/50 |
| 11,307,044 | B2 * | 4/2022 | Matsumoto ........ | G01C 21/3476 |

FOREIGN PATENT DOCUMENTS

| | | | |
|---|---|---|---|
| CN | 106161792 | * | 2/2020 |
| JP | 2019-186671 A | | 10/2019 |

* cited by examiner

*Primary Examiner* — Chi H Pham
*Assistant Examiner* — Raul Rivas
(74) *Attorney, Agent, or Firm* — Rankin, Hill & Clark LLP

(57) ABSTRACT

An on-vehicle device is connectable to a mobile terminal by a plurality of cooperation methods by use of a plurality of wireless connections, and includes a first connection control unit which performs connection to a first mobile terminal by a first cooperation method by use of a first wireless connection, a second connection control unit which performs connection to the first mobile terminal by a second cooperation method by use of a second wireless connection, and a display unit which displays a connected state to the first mobile terminal, the display unit displays a cooperation method selection image including a first selection part to execute connection by the first connection control unit, and a second selection part to execute connection by the second connection control unit, and the first selection part and the second selection part are displayed concurrently in the display unit.

7 Claims, 8 Drawing Sheets

ON-VEHICLE DEVICE AND CONTROL METHOD OF ON-VEHICLE DEVICE

INCORPORATION BY REFERENCE

The present application claims priority under 35 U.S.C. § 119 to Japanese Patent Application No. 2021-047859 filed on Mar. 22, 2021. The content of the application is incorporated herein by reference in its entirety.

BACKGROUND OF THE INVENTION

Field of the Invention

The present invention relates to an on-vehicle device connected to a mobile terminal and a control method of the on-vehicle device.

Description of the Related Art

Heretofore, a so-called car navigation system mounted on a vehicle has had a function of providing a vehicle current position and route guidance to a destination as a single unit. As an alternative to the car navigation system, a user in the vehicle may use a map application of a mobile terminal such as a smartphone. In the use of the smartphone, there are a number of advantages such as ease of connection of the smartphone itself to a network, and availability of applications achieving various functions.

In recent years, an audio system, or the like by use of a cooperation function of the smartphone has started to be mounted in the vehicle. Examples of such a system include a device connected to the smartphone to use an application on the smartphone, and a configuration where a navigation function is omitted from the car navigation system, and instead, a navigation function by a map application on the smartphone may be used. A system using the conventional car navigation system and cooperating with the smartphone is also included.

It is considered that connection of the smartphone to the audio system or the like is connection by a plurality of methods. As wired connection, connection via an USB cable is considered. Also, as wireless connection, Bluetooth (registered trademark), WiFi (registered trademark) or the like is considered. As for wireless connection to the smartphone, in general, connection by a plurality of cooperation methods is possible.

For example, Japanese Patent Laid-Open No. 2019-discloses a technology of avoiding occurrence of user confusion, in a case where the smartphone or another mobile terminal is connectable to an on-vehicle device by a plurality of cooperation methods.

SUMMARY OF THE INVENTION

Technical Problem

An object of the present invention is to provide an on-vehicle device which can easily register and switch a plurality of cooperation methods by use of wireless connection, and which is also easily connectable to a new mobile terminal.

Solution to Problem

An aspect to achieve the above object provides an on-vehicle device which is connectable to a mobile terminal by a plurality of cooperation methods by use of a plurality of wireless connections, the on-vehicle device including a first connection control unit which performs connection to a first mobile terminal by a first cooperation method by use of a first wireless connection, a second connection control unit which performs connection to the first mobile terminal by a second cooperation method by use of a second wireless connection, and a display unit which displays a connected state to the first mobile terminal, wherein the display unit displays a cooperation method selection image including a first selection part to execute connection by the first connection control unit, and a second selection part to execute connection by the second connection control unit, and the first selection part and the second selection part are displayed concurrently in the display unit.

Advantageous Effects of Invention

An on-vehicle device in the present disclosure can easily switch a plurality of cooperation methods and/or can easily connect to a new mobile terminal.

DETAILED DESCRIPTION OF THE PREFERRED EMBODIMENT (Findings of Basis of Present Disclosure and the Like)

At the time when the present inventors came to the present disclosure, there was a technology of an audio system as an on-vehicle device connectable to a mobile information terminal (hereinafter referred to as the mobile terminal) such as a smartphone. For the system, a cooperation function of the smartphone is usable. Consequently, an application of the smartphone can be operated with a display in a vehicle. As an alternative to a car navigation system, a function of a map application included in the mobile terminal can be used. In this way, a function that a user is accustomed to use on a mobile terminal side can be cooperated with the on-vehicle device without compromising usability.

However, the present inventors have found a problem that an operation is remarkably laborious in selecting a mobile terminal to be connected in a case where a plurality of mobile terminals are brought in the vehicle, or selecting a cooperation method in a case where a plurality of wireless connections and a plurality of cooperation methods are available, and the inventors have developed a subject of the present disclosure to solve the problem.

To solve the problem, the present disclosure provides an on-vehicle device which can easily register a cooperation method by use of a plurality of wireless connections, can easily switch a plurality of cooperation methods, and can easily connect to a new mobile terminal (device).

Hereinafter, an embodiment will be described in detail with reference to the drawings. However, description more detailed than necessary may not be made. For example, detailed description of matter already known well or duplicate description of about the same configuration may not be made. This avoids that the following description is redundant more than necessary, and facilitates understanding by a person skilled in the art.

Note that the accompanying drawings and the following description, which are provided for the person skilled in the art to fully understand the present disclosure, are not intended to limit a subject described in claims.

Embodiment

Hereinafter, the embodiment will be described with reference to FIGS. 1 to 8.
[1. Configuration]
[1-1. Configuration of Mobile Terminal Cooperation System]

Figure 1:
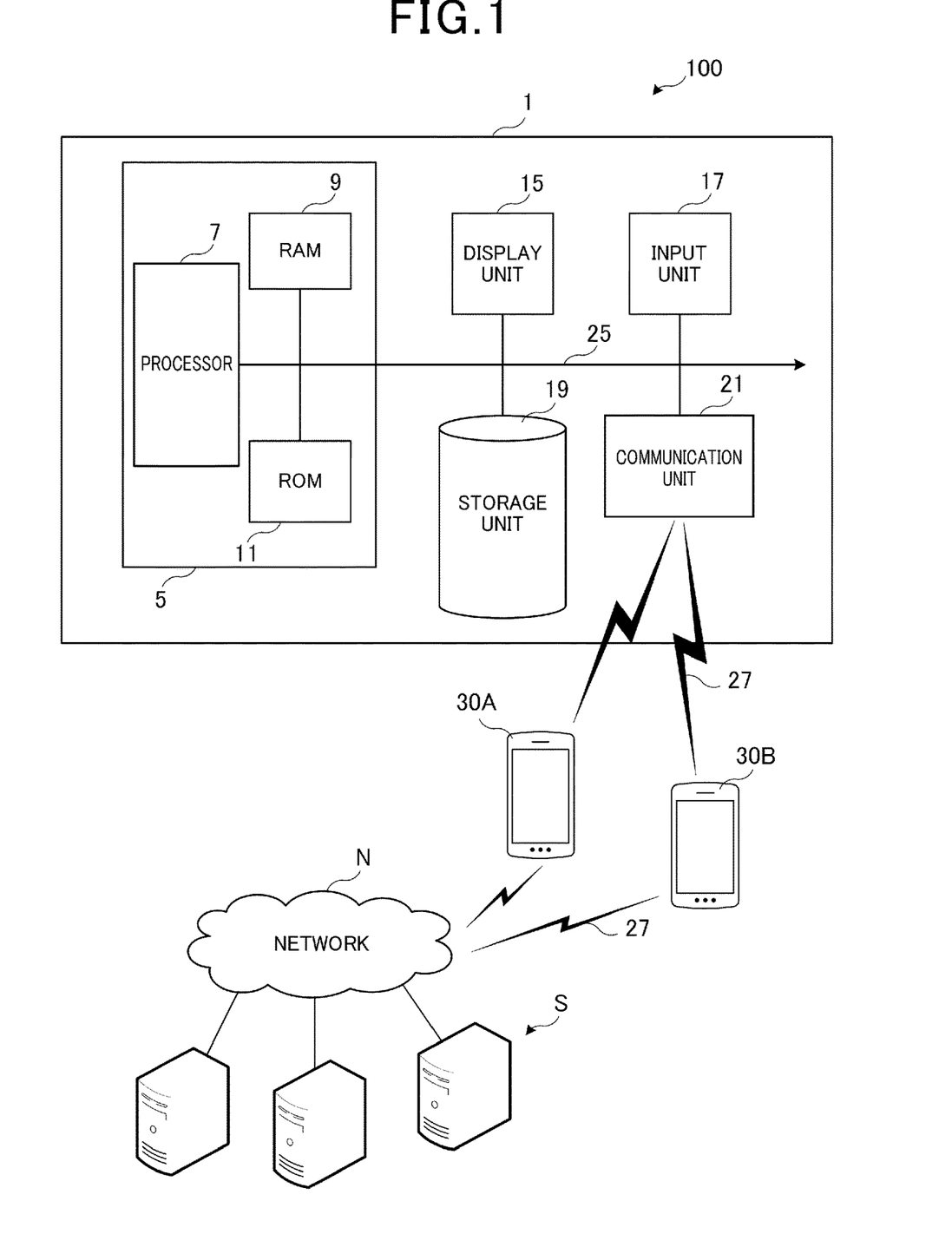
FIG. 1 is a configuration diagram of an on-vehicle device, and a mobile terminal cooperation system including a mobile terminal.

FIG. 1 is a configuration diagram of a mobile terminal cooperation system 100 including an on-vehicle device 1 and a mobile terminal 30. The mobile terminal cooperation system 100 includes the on-vehicle device 1 and at least one mobile terminal 30, and the mobile terminal 30 connects to a network N through wireless connection 27. The network N is connected to a server (computer) S.

A communication method of the wireless connection 27 may be WiFi (registered trademark), or connection by use of a general wireless communication system. It is considered that in an example of the cooperation method by WiFi, an application on a mobile terminal 30 side is Apple CarPlay (registered trademark) or Android Auto (registered trademark). At this time, it is desirable that the on-vehicle device 1 has a specification that may correspond to each application on the mobile terminal 30 side. Also, it is considered that the communication method of the wireless connection 27 may be short-range wireless communication, for example, Bluetooth (registered trademark). The mobile terminal 30 transmits and receives data to and from the server S and the on-vehicle device 1. For example, the mobile terminal 30 transmits, to the on-vehicle device 1, image information processed by an application included in the mobile terminal 30, and the on-vehicle device 1 displays the image information in a display unit included in the on-vehicle device 1.

An example of the data may be positional information by use of a GPS function included in the mobile terminal 30, and an example of the data to be transmitted to the on-vehicle device 1 may be map information around a place where a vehicle is located, the map information being acquired from the server S. An example of information to be transmitted from the on-vehicle device 1 to the mobile terminal 30 may be information to operate an application included in the mobile terminal 30, the application being inputted from an input unit 17 of the on-vehicle device 1 into the mobile terminal by a user.

Also, data to be managed in the mobile terminal cooperation system 100 may be video information distributed by the server S, or voice information. Certainly, in a case where a smartphone is used as the mobile terminal 30, the data may be call data to be transmitted and received by a phone function that the smartphone has.

[1-2. Configuration of On-Vehicle Device]

The on-vehicle device 1 includes a control device 5 which controls the whole on-vehicle device 1, a storage unit (memory) 19 which stores information concerning the control, a display unit 15 which outputs image information and voice information, the input unit 17 which inputs information to fulfill a function of the on-vehicle device 1, a communication unit 21 (transmitter/receiver, circuit) which communicates with the mobile terminal 30, and a bus 25.

The control device 5 may include a processor 7, a random-access memory (RAM) 9, and a read only memory (ROM) 11.

The control device 5 in the present disclosure may only control the on-vehicle device 1 in the present disclosure. The control device 5 can be obtained in various modes. The processor reads program from the storage unit 19 in which the program is stored, and the processor executes the program, so that various processing can be executed. Consequently, processing content can be changed by changing the program stored in the storage unit 19, and hence a degree of freedom in changing control content can be increased. Examples of the processor include a central processing unit (CPU) and a micro-processing unit (MPU). Examples of the storage unit 19 include a hard disk, a flash memory, and an optical disk. Also, as the control device 5, wired logic may be used in which the program cannot be rewritten. If the wired logic is used as the control device 5, a processing speed can be effectively increased. An example of the wired logic is an application specific integrated circuit (ASIC). Also, the control device 5 may be obtained by combining the processor and the wired logic. If the control device 5 is obtained by combining the processor and the wired logic, the processing speed can be increased while increasing a degree of freedom in software design. Furthermore, the control device 5 and a circuit having a function other than that of the control device 5 may be included in one semiconductor element. An example of the circuit having the other function is an A/D or D/A conversion circuit. Alternatively, the control device 5 may be constituted of one semiconductor element, or a plurality of semiconductor elements. In a case where the device is constituted of the plurality of semiconductor elements, respective control operations described in claims may be performed by mutually different semiconductor elements. Furthermore, the control device 5 may include the semiconductor element and a passive component such as a resistor or a capacitor.

The display unit 15 and the input unit 17 of the on-vehicle device 1 according to the present disclosure are considered in various embodiments. The input unit 17 is used by the user to input information into the on-vehicle device 1 of the present disclosure. The display unit 15 is used by the on-vehicle device 1 of the present disclosure to output information to the user. The input unit 17 may be an input unit 17 including mechanical operation members. Alternatively, a touch panel may be formed as an operation member by disposing a transparent input unit 17 in the surface of the display unit 15. As this transparent operation member, a contact member or a noncontact member may be used. Alternatively, the input unit 17 may be configured in such a manner that the on-vehicle device 1 or the mobile terminal 30 of the present disclosure recognizes user's operation photographed with a camera. Alternatively, the input unit 17 may be configured in such a manner that the on-vehicle device 1 or the mobile terminal 30 of the present disclosure receives sound made by the user. The display unit 15 may be constituted of a display. As the display, a liquid crystal display, an organic EL display, or another display may be used. Alternatively, the display unit 15 may be configured to turn on or off light by use of LED or the like. Alternatively, the display unit 15 may be configured to display an image with the display, a projector, or the like. In the on-vehicle device 1, an unshown output unit may be provided in addition to the display unit 15. It is considered that an example of the output unit is a speaker which transmits voice information to the user. Alternatively, the input unit 17 may further include a microphone or the like which can acquire the voice information to recognize voice.

Figure 2:
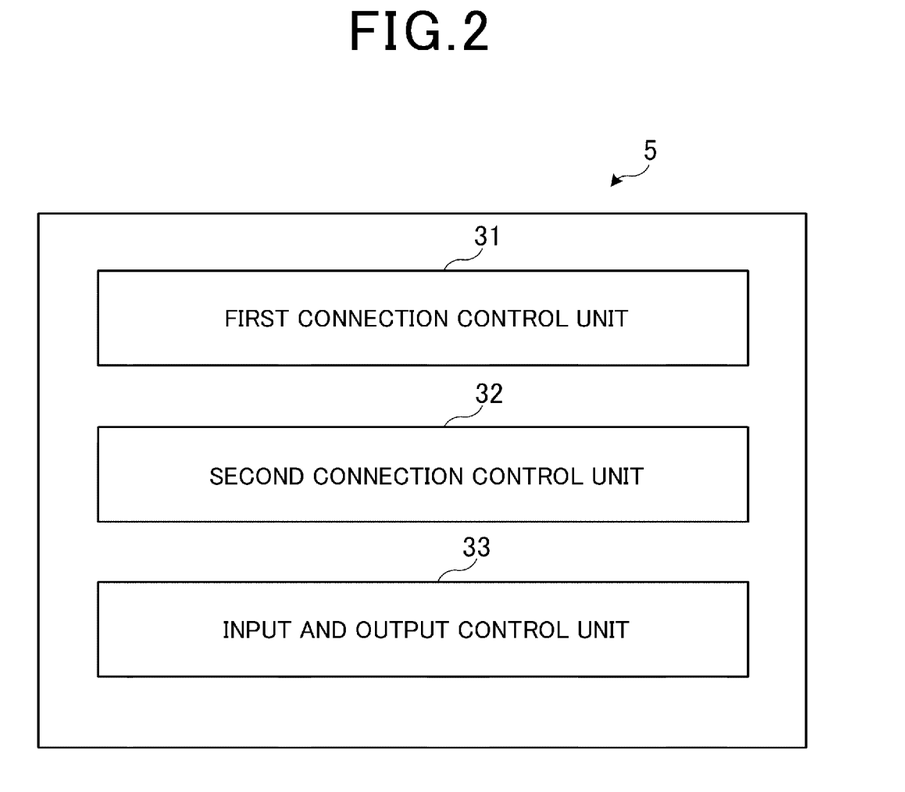
FIG. 2 is a function block diagram of a control device.

FIG. 2 is a function block diagram of the control device 5. The control device 5 may obtain a function of a first connection control unit which performs connection to the mobile terminal by a first cooperation method by use of a first wireless connection, and a function of a second connection control unit which performs connection to the mobile terminal by a second cooperation method by use of a second wireless connection. Also, the device includes a function of an input and output control unit 33 which controls the display unit 15 displaying the information, the input unit 17 inputting the information, and the communication unit 21 communicating with the mobile terminal 30 or the like. Specifically, the control device 5 may obtain the above function, for example, by reading the program stored in the storage unit 19.

The first cooperation method is, for example, Bluetooth. The second cooperation method is, for example, a cooperation method by use of WiFi.

[2. Operation]

Next, an operation of the above embodiment will be described.

Figure 3:
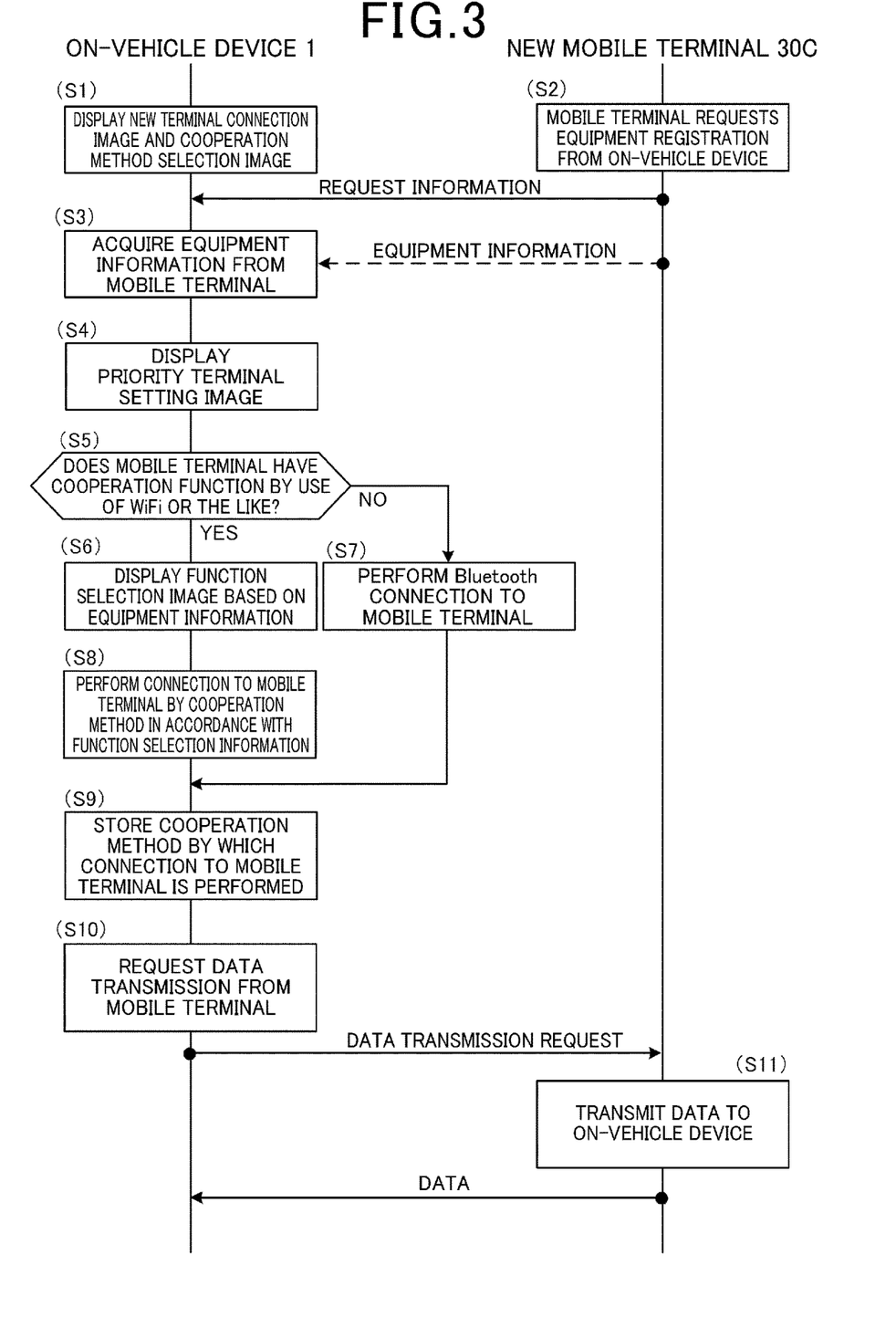
FIG. 3 is a flowchart explaining an operation of the on-vehicle device.

FIG. 3 is a flowchart explaining an operation of the on-vehicle device 1. FIG. 3 explains the operation in a case of connecting a new mobile terminal 30C with no connection history to the on-vehicle device 1.

First, the on-vehicle device 1 according to the present embodiment displays, in the display unit 15, a cooperation method selection image 60 including a first selection part 40 to execute connection by a first connection control unit 31, and a second selection part 50 to execute connection by a second connection control unit 32. At this time, the cooperation method selection image 60 may include a terminal selection part 35 with which the user can select connection to a mobile terminal 30A with connection history. Concurrently, the display unit 15 also displays a new terminal connection image 63 including a third selection part 55 to execute connection to the new mobile terminal 30C with no connection history. The new terminal connection image 63 is displayed concurrently with the cooperation method selection image 60 in the display unit 15 (step S1).

Note that as will be described later with reference to FIG. 4, as to the terminal selection part 35, for example, a name or a product name of the mobile terminal may be displayed. When the new mobile terminal 30C is wirelessly connectable, the new mobile terminal 30C requests equipment registration from the on-vehicle device 1 (step S2). Specifically, the new mobile terminal 30C transmits request information to the on-vehicle device 1. Depending on the request information, the on-vehicle device 1 acquires equipment information from the new mobile terminal 30C (step S3). Specifically, the equipment information may include information concerning a type of the cooperation method by use of wireless connection which can be performed in the mobile terminal 30, or information on a profile supported by the new mobile terminal 30C.

The on-vehicle device 1 displays, in the display unit 15, a priority terminal setting image 65 with which the user can select whether to register the new mobile terminal 30C as a priority terminal (step S4). Description will be made later as to the priority terminal setting image 65 with reference to FIG. 5. The control device 5 of the on-vehicle device 1 determines whether the new mobile terminal 30C is connectable by a cooperation method other than Bluetooth, specifically by a cooperation method by use of wireless communication of WiFi or the like (step S5). Specifically, for example, it is determined whether the new mobile terminal 30C includes an application to cooperate with the on-vehicle device 1 by use of WiFi. In a case where the new mobile terminal 30C includes a cooperation function with the on-vehicle device 1 by use of WiFi or the like (YES in step S5), the on-vehicle device 1 displays, in the display unit 15, a function selection image 70 based on the equipment information (step S6). Then, the connection to the new mobile terminal 30C is performed by the cooperation method in accordance with function selection information inputted by the user (step S8).

In a case where the new mobile terminal 30C does not have the cooperation function with the on-vehicle device 1 by use of WiFi or the like (NO in step S5), the on-vehicle device 1 performs connection to the new mobile terminal 30C by Bluetooth (step S7). The on-vehicle device 1 stores the cooperation method by which the new mobile terminal 30C is connected (step S9). Then, the on-vehicle device transmits a request of data transmission to the cooperated new mobile terminal 30C (step S10), the new mobile terminal 30C transmits the data to the on-vehicle device 1 (step S11), and the on-vehicle device 1 cooperates with the mobile terminal 30 to perform processing.

Figure 4:
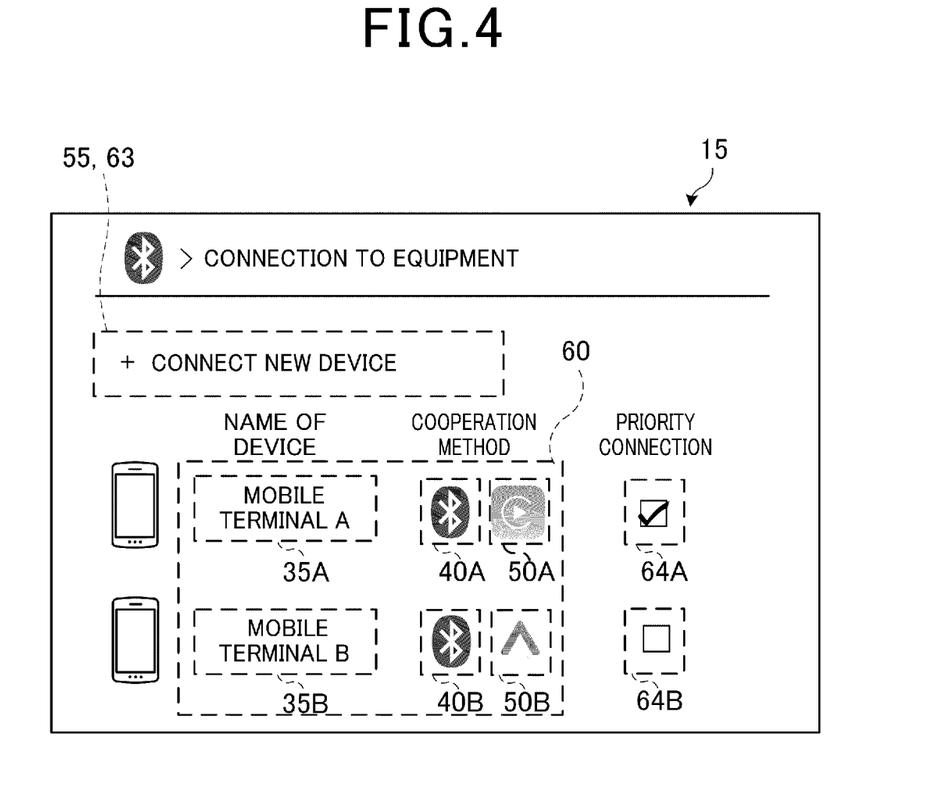
FIG. 4 is an explanatory view of a cooperation method selection image, a priority terminal display image, and a new terminal connection image.

FIG. 4 is an explanatory view of the cooperation method selection image 60, the new terminal connection image 63, and a priority terminal display image 64 which are displayed in the display unit 15. The cooperation method selection image 60 and the new terminal connection image 63 are displayed concurrently in the display unit 15. An example is described below on assumption that the display unit 15 is a touch panel of an image display device including the transparent input unit 17 in a display surface, but an input method is not limited to this example. Following an instruction of image display, the user may operate a mechanical switch disposed in advance, to input information. The user may input information by use of the mobile terminal 30.

The cooperation method selection image 60 includes the terminal selection part 35, the first selection part 40, and the second selection part 50 for each connectable mobile terminal 30 with past connection history.

The on-vehicle device 1 is an on-vehicle device connectable to the mobile terminal by a plurality of cooperation methods by use of a plurality of wireless connections, and the on-vehicle device includes the first connection control unit 31 which performs connection to the mobile terminal 30A that is the first mobile terminal by the first cooperation method by use of the first wireless connection, the second connection control unit 32 which performs connection to the mobile terminal 30A that is the first mobile terminal by the second cooperation method by use of the second wireless connection, and the display unit 15 which displays the connected state of the first mobile terminal to the on-vehicle device 1. Also, the display unit 15 displays the cooperation method selection image 60 including the first selection part 40 to execute connection by the first connection control unit 31, and the second selection part 50 to execute connection by the second connection control unit 32, and the first selection part 40 and the second selection part 50 are displayed concurrently in the display unit 15.

The on-vehicle device 1 includes the storage unit 19 which stores the equipment information of the mobile terminal with past connection history. The storage unit 19 stores the cooperation method used in the closest connection in time, even in a case where the mobile terminal 30A that is the first mobile terminal has the past connection history, and the display unit 15 displays the priority terminal display image 64 with which a priority terminal to be preferentially connected is selectable in advance, concurrently with the cooperation method selection image 60.

Specifically, in a case where a plurality of mobile terminal 30A and mobile terminal 30B are terminals with connection history and the mobile terminal 30A is already set to be preferentially connected, a priority terminal display image 64A indicating that effect is displayed with an image of a check box to be checked.

Note that a first selection part 40A may be an icon, and the first selection part 40A of FIG. 4 is a mark indicating Bluetooth. Further, in a case where a second selection part 50A is touched with user's finger, connection of the mobile terminal 30A to the on-vehicle device 1 is executed by the second cooperation method by use of the second connection control unit 32. The second selection part 50A may be an icon, and the second selection part 50A of FIG. 4 is a mark indicating CARPLAY.

Also, a first selection part 40B of FIG. 4 is a mark indicating Bluetooth. Further, in a case where a second selection part 50B is touched with user's finger, connection of the mobile terminal 30B to the on-vehicle device 1 is executed by the second cooperation method by use of the second connection control unit 32. The second selection part 50B may be an icon, and the second selection part 50B of FIG. 4 is a mark indicating Android Auto. Note that in a case where the mobile terminal 30B is not the priority terminal, a priority terminal display image 64B may be an unchecked check box.

For example, as to the mobile terminal 30A, the display unit 15 displays a terminal selection part 35A, the first selection part 40A, the second selection part 50A and the priority terminal display image 64A which are arranged in a lateral direction of the display unit 15. In a case where the terminal selection part 35A is touched with user's finger, the mobile terminal 30A is selected as the mobile terminal 30 to be connected to the on-vehicle device 1, to transit to a screen for setting the cooperation method of the mobile terminal 30A with the on-vehicle device 1. Then, in the screen, for example, connection of the mobile terminal 30A to the on-vehicle device 1 is executed by the first cooperation method by use of the first connection control unit 31.

For example, as to the mobile terminal 30B, the display unit 15 displays a terminal selection part 35B, the first selection part 40B, the second selection part 50B, and the priority terminal display image 64B which are arranged in the lateral direction of the display unit 15. In a case where the terminal selection part 35B is touched with user's finger, the mobile terminal 30B is selected as the mobile terminal 30 to be connected to the on-vehicle device 1, to transit to a screen for setting the cooperation method of the mobile terminal 30B with the on-vehicle device 1. Then, in the screen, for example, connection of the mobile terminal 30B to the on-vehicle device 1 is executed by the first cooperation method by use of the first connection control unit 31.

In a case where the user is to change the mobile terminal to be preferentially connected, specifically, for example, in a case where the user is to change the priority terminal from the mobile terminal 30A to the mobile terminal 30B, the priority terminal display image 64B may be touched with user's finger to change the priority terminal. After the change, the mobile terminal 30B is preferentially connected to the on-vehicle device 1 from next connection opportunity.

When the display unit 15 displays the cooperation method selection image 60, and in a case where the on-vehicle device 1 detects the mobile terminal 30A, the mobile terminal 30A may be connected in advance by the cooperation method used in the past connection by the on-vehicle device 1. In this case, an icon corresponding to the cooperation method being connected may be highlighted. Specifically, in a case where the mobile terminal 30A is connected by the second cooperation method in which the second connection control unit 32 is used in the closest connection in time, the second selection part 50A may be highlighted.

The display unit 15 displays the new terminal connection image 63 including the third selection part 55 to execute connection to a second mobile terminal. The new terminal connection image 63 is displayed concurrently with the cooperation method selection image 60 in the display unit 15.

Figure 5:
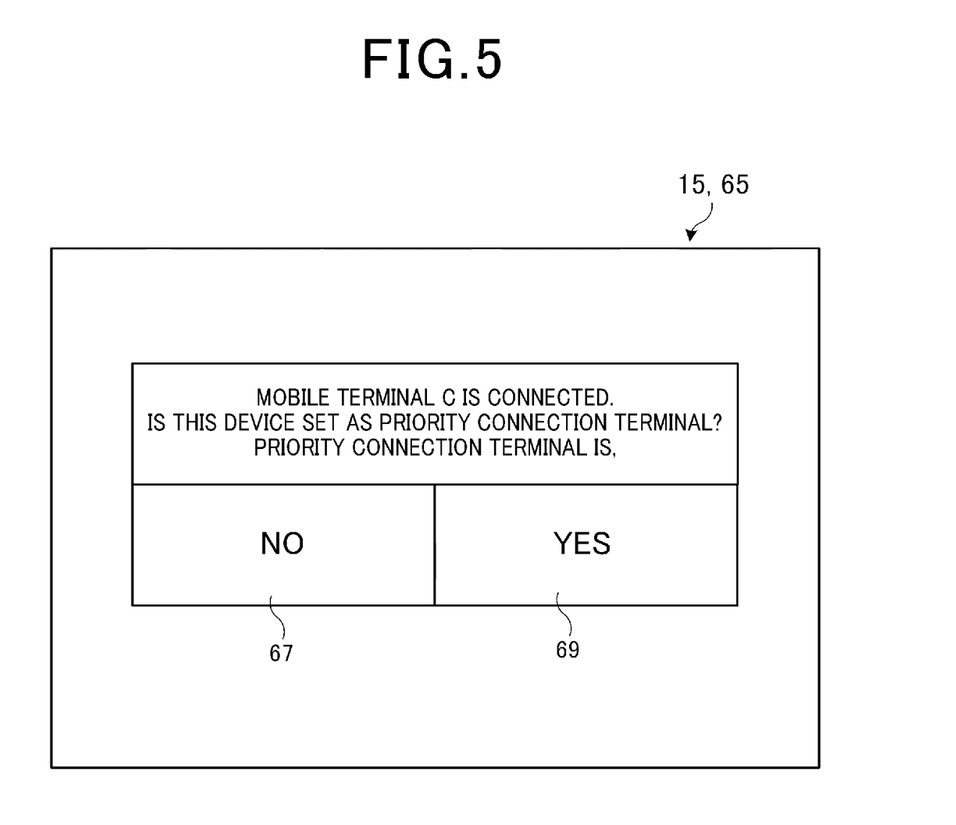
FIG. 5 is an explanatory view of a priority terminal setting image.

FIG. 5 is an explanatory view of the priority terminal setting image 65. The priority terminal setting image 65 is, for example, an image displayed in the display unit 15 in the step S4 of the flowchart shown in FIG. 3. The priority terminal setting image 65 is displayed in a case where the new mobile terminal 30C with no connection history is connected to the on-vehicle device 1.

Specifically, in a case where the second mobile terminal that is the new mobile terminal 30C with no past connection history is connected, the display unit 15 displays the priority terminal setting image 65 with which it can be selected whether to preferentially connect the second mobile terminal.

Specifically, the priority terminal setting image 65 is an image which asks the user to determine whether the new mobile terminal 30C is set as a priority connection terminal to be preferentially connected, when connecting the new mobile terminal 30C. It is considered that the user is asked to make the similar determination, by voice, instead of displaying the image. In a case where the user touches a priority setting rejection image 67, setting as to the already set priority connection terminal is maintained, and in a case where the user touches a priority setting acceptance image 69, the mobile terminal 30C is set as the priority connection terminal.

Figure 6:
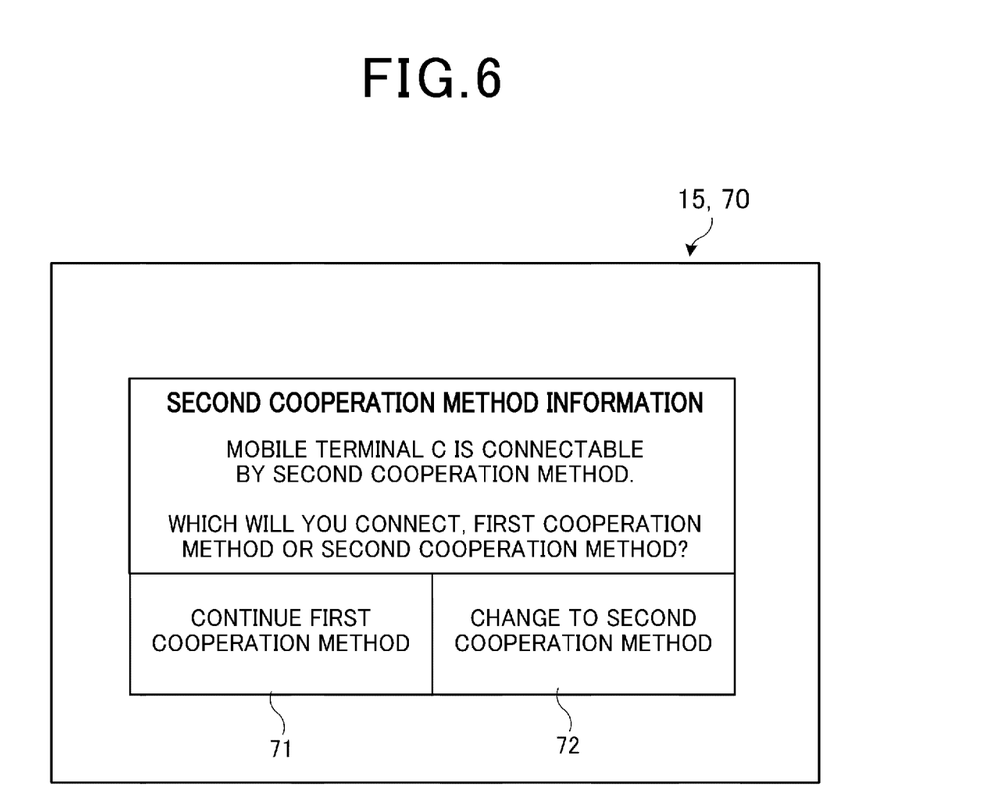
FIG. 6 is an explanatory view of a function selection image.

FIG. 6 is an explanatory view of the function selection image 70. The function selection image 70 is, for example, an image displayed in the display unit 15 in the step S6 of the flowchart shown in FIG. 3.

For example, in a case where the mobile terminal 30C is connectable to the on-vehicle device 1 by a plurality of cooperation methods, specifically in a case where the mobile terminal is connectable to the on-vehicle device 1 by two cooperation methods, i.e., the first cooperation method and the second cooperation method, the display unit 15 displays the function selection image 70 including a cooperation method continuation image 71 and a cooperation method change image 72, so that the user can select one of the cooperation methods. For example, in a case where the cooperation method continuation image 71 is touched with user's finger, the on-vehicle device 1 and the mobile terminal 30C are connected by the first cooperation method, and in a case where the cooperation method change image 72 is touched with user's finger, the on-vehicle device 1 and the mobile terminal 30C are connected by the second cooperation method.

In general, the mobile terminal 30 includes the cooperation method by Bluetooth and the cooperation method with WiFi. For example, in a case where the mobile terminal 30 uses iOS (registered trademark) as an operating system, and when Bluetooth is the first cooperation method and Apple CarPlay by use of WiFi is the second cooperation method, the user may select one of the cooperation methods. FIG. 6 shows the image on assumption that the mobile terminal 30C is connected to the on-vehicle device 1 in advance by the first cooperation method. Alternatively, the mobile terminal 30C and the on-vehicle device 1 may be connected by another cooperation method as an initial value.

Figure 7:
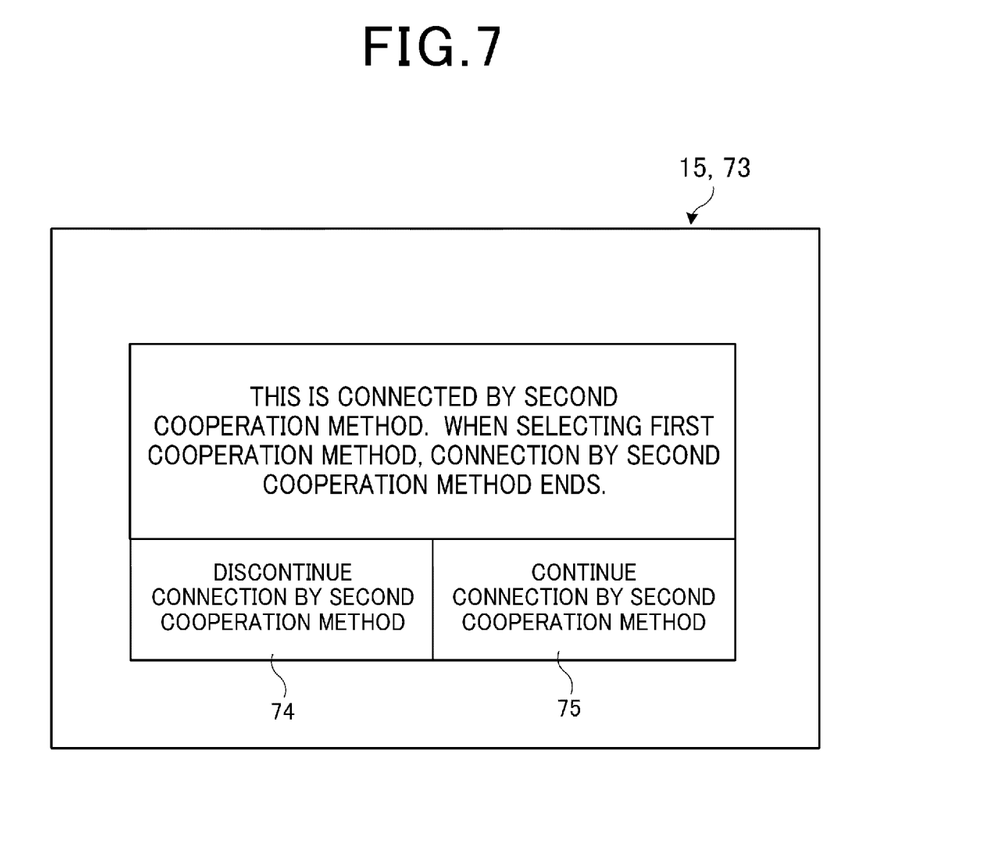
FIG. 7 is an explanatory view of a connection operation image.

FIG. 7 is an explanatory view of a connection operation image 73. The connection operation image 73 is an image displayed, for example, in a case where the cooperation method selection image 60 shown in FIG. 4 is displayed in the display unit 15 and, when the second cooperation method is selected as an initial setting value, the first selection part 40A is touched with user's finger, specifically when the user desires to switch the cooperation method.

The connection operation image 73 includes a discontinuation selection image 74 to be selected in a case where the user discontinues the connection by the second cooperation method to continue the connection by the first cooperation method, and a continuation selection image 75 to be selected in a case where the user continues the connection by the first cooperation method.

Figure 8:
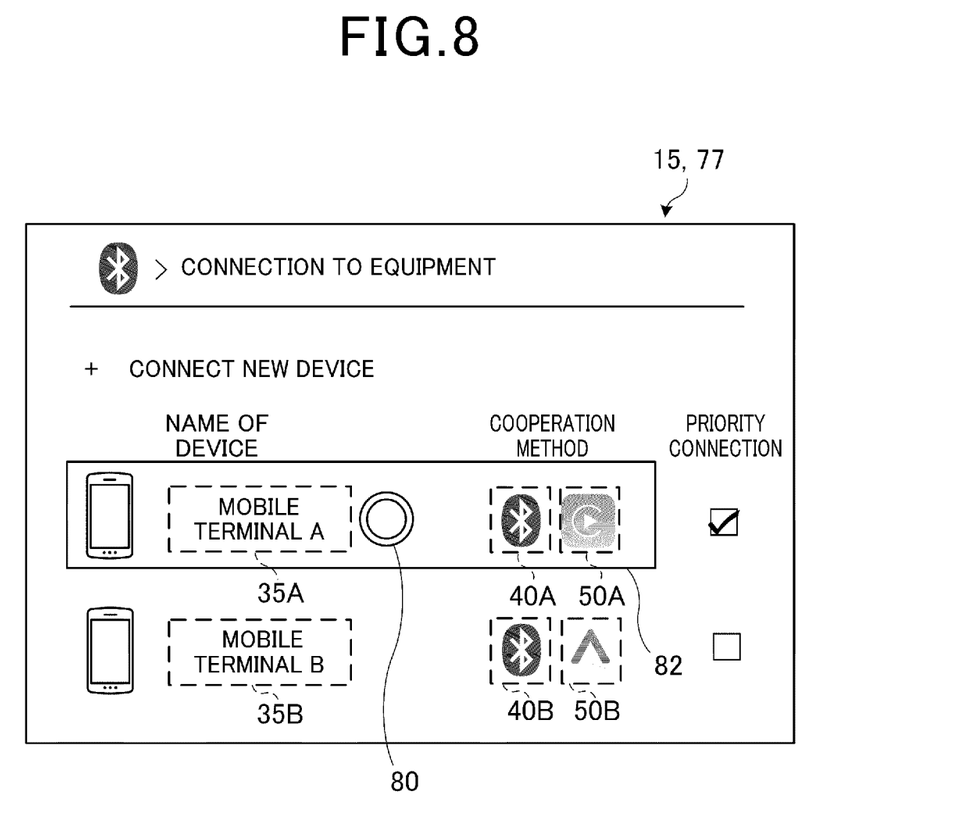
FIG. 8 is an explanatory view of a connection processing display image.

FIG. 8 is an explanatory view of a connection processing display image 77. The connection processing display image 77 may be displayed in the display unit 15, when the on-vehicle device 1 and the mobile terminal 30 are connected. The connection processing display image 77 includes a highlighting image 80 indicating that processing of equipment connected to the on-vehicle device 1 is possible. Specifically, FIG. 8 shows that in the mobile terminal 30A and the mobile terminal 30B which are connectable to the on-vehicle device 1, the mobile terminal 30A and the on-vehicle device 1 are connected. At this time, to highlight the mobile terminal 30 operable in the on-vehicle device 1, a frame image 82 may be displayed. Alternatively, a name or the like of the mobile terminal 30 which is operable in the on-vehicle device 1 may be highlighted.

[3. Effects]

As described above, an on-vehicle device 1 according to the present embodiment is the on-vehicle device 1 which is connectable to a mobile terminal 30 by a plurality of cooperation methods by use of a plurality of wireless connections, the on-vehicle device including a first connection control unit 31 which performs connection to a first mobile terminal by a first cooperation method by use of a first wireless connection, a second connection control unit 32 which performs connection to the first mobile terminal by a second cooperation method by use of a second wireless connection, and a display unit 15 which displays a connected state to the first mobile terminal, wherein the display unit 15 displays a cooperation method selection image 60 including a first selection part 40 to execute connection by the first connection control unit 31, and a second selection part 50 to execute connection by the second connection control unit 32, and the first selection part 40 and the second selection part 50 are displayed concurrently in the display unit 15.

According to the on-vehicle device 1 of the present disclosure, in a case where the on-vehicle device 1 and the mobile terminal 30 may be connected by the plurality of cooperation methods, a user can easily select a desirable cooperation method. For example, in place of WiFi connection in which data transfer is fast and battery consumption of the mobile terminal 30 is high, Bluetooth connection in which data transfer is slow and battery consumption of the mobile terminal 30 is low can be selected. Conversely, when cooperation by WiFi connection is performed in place of Bluetooth connection, various processing can be performed in the on-vehicle device 1 by use of an application of the mobile terminal 30. Therefore, the on-vehicle device 1 and the mobile terminal 30 can be comfortably cooperated.

Also, the on-vehicle device 1 according to the present embodiment includes a storage unit 19 which stores equipment information of a mobile terminal 30 with past connection history, the storage unit 19 stores a cooperation method used in the closest connection in time, even in a case where the mobile terminal 30A that is the first mobile terminal has past connection history, and the display unit 15 displays a priority terminal display image 64 with which a priority terminal to be preferentially connected is selectable in advance, concurrently with the cooperation method selection image 60.

According to the on-vehicle device 1 of the present disclosure, among a plurality of mobile terminals 30, the mobile terminal 30 preferably considered to be preferentially connected can be connected to the on-vehicle device 1. Then, a degree of priority of the terminal can be easily changed on a screen. Therefore, the on-vehicle device 1 and the mobile terminal 30 can be easily wirelessly connected, and comfortably cooperated.

Also, the on-vehicle device 1 according to the present embodiment includes a storage unit 19 which stores equipment information of a mobile terminal with past connection history, and the storage unit 19 stores an immediately previous cooperation method that is a cooperation method used in the closest connection in time in a case where there is past connection to the first mobile terminal, connection to the first mobile terminal by the immediately previous cooperation method is executed, and the display unit 15 highlights a part corresponding to the immediately previous cooperation method in the cooperation method selection image 60.

According to the on-vehicle device 1 of the present disclosure, the mobile terminal with past connection history is automatically connected based on the history, and the cooperation method during the connection can be easy to understand and visually recognized. Therefore, the mobile terminal can be comfortably connected without the user worrying about the cooperation method of the on-vehicle device and the mobile terminal.

In a case where the on-vehicle device 1 according to the present embodiment is connected to a second mobile terminal with no past connection history, the display unit 15 displays a priority terminal setting image 65 with which it is selectable whether to preferentially connect the second mobile terminal.

According to the on-vehicle device 1 of the present disclosure, in a case where the on-vehicle device 1 and a plurality of mobile terminals 30 may be connected, when the second mobile terminal with no particular past connection history is connectable for the first time, the user can easily set preferential connection to the second mobile terminal as initial setting. Therefore, the on-vehicle device 1 and the new mobile terminal 30 can be comfortably cooperated.

Further, in the on-vehicle device 1 according to the present embodiment, the first cooperation method is a Bluetooth (registered trademark) communication method, the second cooperation method is a WiFi (registered trademark) communication method, and in a case where it is determined whether the second mobile terminal with no past connection history is connectable by the second cooperation method, and the second mobile terminal has a cooperation function by use of the second cooperation method, the display unit 15 displays a function selection image based on equipment information of the second mobile terminal, and connection to the second mobile terminal is performed by the cooperation method in accordance with subsequently inputted function selection information.

According to the on-vehicle device 1 of the present disclosure, a plurality of cooperation methods can be easily registered.

Also, in the on-vehicle device 1 according to the present embodiment, in a case where the second mobile terminal is connected, the display unit 15 displays a priority terminal setting image 65 with which it is selectable whether to preferentially connect the second mobile terminal.

According to the on-vehicle device 1 of the present disclosure, in a case where the on-vehicle device 1 and the plurality of mobile terminals 30 may be connected, the mobile terminal 30 desired to be preferentially connected by the user can be easily set. Therefore, the on-vehicle device 1 and the mobile terminal 30 can be comfortably cooperated.

Further, in the on-vehicle device 1 according to the present embodiment, the display unit 15 displays a highlighting image 80 indicating a connected state to a mobile terminal 30.

According to the on-vehicle device 1 of the present disclosure, even in a case where a plurality of connectable mobile terminals 30 are in a vehicle, the mobile terminal 30 being connected and being processing information is clear, and hence it is possible to easily acquire information indicating the mobile terminal 30 to be called, the mobile terminal 30 which is processing the information, or the like.

As above, the embodiment has been described as illustration of a technology disclosed in the present application. However, the technology in the present disclosure is not limited to this embodiment, and is applicable, for example, to the changed, replaced, added, or omitted embodiment. Also, respective constituent elements described in the above embodiment can be combined to form a new embodiment.

For example, the operation shown in FIG. 3 is divided into step units in accordance with main processing content to facilitate understanding of the operation of each part of the on-vehicle device 1, and the present invention is not limited by a way of dividing the operation into processing units or a name of each unit. The operation may be divided into much more step units depending on processing content. Alternatively, the operation may be divided in such a manner that one step unit includes more processing. Alternatively, a step order may be appropriately changed without departing from the spirit of the present invention.

REFERENCE SIGNS LIST

1 on-vehicle device
5 control device
7 processor
9 RAM
11 ROM
15 display unit
17 input unit
19 storage unit
21 communication unit
25 bus
27 wireless connection
30 mobile terminal
31 first connection control unit
32 second connection control unit
33 input and output control unit
35 terminal selection part
40 first selection part
50 second selection part
55 third selection part
60 cooperation method selection image
63 new terminal connection image
64 priority terminal display image
65 priority terminal setting image
67 priority setting rejection image
69 priority setting acceptance image
70 function selection image
71 cooperation method continuation image
72 cooperation method change image
73 connection operation image
74 discontinuation selection image
75 continuation selection image
77 connection processing display image
80 highlighting image
82 frame image
100 mobile terminal cooperation system
N network
S server

What is claimed is:

1. An on-vehicle device which is connectable to a mobile terminal by a plurality of cooperation methods by use of a plurality of wireless connections, the on-vehicle device comprising:
a processor executing
a first connection control which performs connection to a first mobile terminal by a first cooperation method by use of a first wireless connection, and
a second connection control which performs connection to the first mobile terminal by a second cooperation method by use of a second wireless connection;
a display which displays a connected state to the first mobile terminal, wherein the display displays a cooperation method selection image including:
a first selection part to execute connection by the first connection control, and
a second selection part to execute connection by the second connection control,
wherein the first selection part and the second selection part are displayed concurrently in the display; and
a memory which stores equipment information of a mobile terminal with past connection history,
wherein the memory stores an immediately previous cooperation method that is a cooperation method used in a closest connection in time in a case where there is past connection to the first mobile terminal,
connection to the first mobile terminal by the immediately previous cooperation method is executed, and
the display highlights a part corresponding to the immediately previous cooperation method in the cooperation method selection image.

2. The on-vehicle device according to claim 1,
wherein the memory stores a cooperation method used in the closest connection in time, even in a case where there is past connection to the first mobile terminal, and
the display displays a priority terminal display image with which a priority terminal to be preferentially connected is selectable in advance, concurrently with the cooperation method selection image.

3. The on-vehicle device according to claim 1, wherein in a case where a second mobile terminal that is a mobile terminal with no past connection history is connectable, the display displays a new terminal connection image including a third selection part to execute connection to the second mobile terminal, and the new terminal connection image is displayed concurrently with the cooperation method selection image in the display.

4. The on-vehicle device according to claim 3, wherein the first cooperation method is a Bluetooth (registered trademark) communication method, the second cooperation method is a WiFi (registered trademark) communication method, and in a case where it is determined whether the second mobile terminal is connectable by the second cooperation method, and the second mobile terminal has a cooperation function by use of the second cooperation method, the display displays a function selection image based on equipment information of the second mobile terminal, and connection to the second mobile terminal is performed by a cooperation method in accordance with subsequently inputted function selection information.

5. The on-vehicle device according to claim 3, wherein in a case where the second mobile terminal is connected, the display displays a priority terminal setting image with which it is selectable whether to preferentially connect the second mobile terminal.

6. The on-vehicle device according to claim 1, wherein the display displays a highlighting image indicating a connected state to a mobile terminal.

7. A control method of an on-vehicle device which is connectable to a mobile terminal by a plurality of cooperation methods by use of a plurality of wireless connections and which includes:

a processor executing a first connection control which performs connection to a first mobile terminal by a first cooperation method by use of a first wireless connection, and a second connection control which performs connection to the first mobile terminal by a second cooperation method by use of a second wireless connection;

a display which displays a connected state to the first mobile terminal; and a memory which stores equipment information of a mobile terminal with past connection history, wherein the memory stores an immediately previous cooperation method that is a cooperation method used in a closest connection in time in a case where there is past connection to the first mobile terminal, and connection to the first mobile terminal by the immediately previous cooperation method is executed, wherein the control method comprises:

displaying, in the display, a cooperation method selection image including:

a first selection part to execute connection by the first connection control, and a second selection part to execute connection by the second connection control, wherein the first selection part and the second selection part are displayed concurrently in the display and the display highlights a part corresponding to the immediately previous cooperation method in the cooperation method selection image.

* * * * *